United States Patent
Kogure et al.

Patent Number: 5,355,922
Date of Patent: Oct. 18, 1994

[54] PNEUMATIC RADIAL TIRE FOR PASSENGER CAPS

[75] Inventors: Tomohiko Kogure, Ashigara; Yoshiaki Hashimura, Isehara, both of Japan

[73] Assignee: The Yokohama Rubber Co., Ltd., Tokyo, Japan

[21] Appl. No.: 875,768

[22] Filed: Apr. 29, 1992

[51] Int. Cl.$^5$ .......................... B60C 9/26; B60C 11/04
[52] U.S. Cl. ................. 152/209 R; 152/526; 152/528
[58] Field of Search .............. 152/209 A, 209 R, 526, 152/527, 528, 538

[56] References Cited

U.S. PATENT DOCUMENTS

| | | | |
|---|---|---|---|
| 4,273,177 | 6/1981 | Nybakken | 152/528 |
| 4,722,381 | 2/1988 | Hopkins et al. | 152/528 |
| 4,749,016 | 6/1988 | Kojima | 152/528 |
| 4,832,102 | 5/1989 | Domchick | 152/527 |
| 4,884,607 | 12/1989 | Mori | 152/209 |
| 4,986,324 | 1/1991 | Suzuki et al. | 152/209 |
| 5,000,239 | 3/1991 | Brayer et al. | 152/209 |
| 5,135,038 | 8/1992 | Graas et al. | 152/209 |

FOREIGN PATENT DOCUMENTS

| | | | |
|---|---|---|---|
| 0327955 | 8/1989 | European Pat. Off. | 152/528 |
| 2066171 | 7/1981 | United Kingdom | 152/209 R |

OTHER PUBLICATIONS

"Pneumatic Tyre Design"; E. C. Woods; 1955 pp. 32–34.
1992 Year Book The Tire and Rim Association, Inc., pp. 1-01, 1-06, 1-08, 1-10, and 1-12.

*Primary Examiner*—Michael W. Ball
*Assistant Examiner*—Nancy T. Krawczyk
*Attorney, Agent, or Firm*—Nikaido, Marmelstein, Murray & Oram

[57] ABSTRACT

A pneumatic radial tire for passenger cars having a plurality of grooves formed in the tread and extending at least circumferentially of the tire, the tread being provided with two belt plies therein. The grooves have a depth in the range of 6.0 to 8.5 mm, with the thickness of the under-groove rubber layer from the bottom of the grooves to the outer belt ply being fixed within the range of 0.5 to 2.5 mm. The belt plies are both made from aramid fiber cords, or either belt ply is made from aramid fiber cords and the other ply from steel cords. The both edge portions of at least one of the belt plies are folded back toward the center of the tread at a fold percentage of 8 to 100 percent.

12 Claims, 3 Drawing Sheets

PNEUMATIC RADIAL TIRE FOR PASSENGER CAPS

BACKGROUND OF THE INVENTION

This invention relates to a pneumatic radial tire for passenger cars designed to improve steering stability while achieving weight reduction of the treadbelt structure.

The recent global spread of environmental pollution has produced a strong demand for more and more fuel-efficient vehicles. One approach, weight reduction of tires, is attracting attention as a major technological challenge.

Among pneumatic radial tires for passenger cars, those in which the belt plies are built of steel cords are known to produce high steering stability. This is because steel cords possess very high strength and resilience compared with other cords of fabrics. However, the steel cords, with greater specific weight, and more to the weight of tires and hence to the fuel cost. They therefore can hardly solve the above-mentioned technical problem.

As a new tire cord material almost comparable to steel cords in characteristics, aramid fiber cords have been proposed. Aramid fiber cords have practically as high strength and resilience as steel cords, but are lighter in specific weight and can contribute to the weight reduction of tires. It has been found, for example, that mere replacement of belt plies of steel cords by those of aramid fiber cords lessens the tire weight by about 5 to 8 percent.

Aramid fiber cords, whose compression rigidity is almost zero, have the disadvantage of exhibiting low flexural rigidity upon exposure to bending deformation. Cornering power given by a tire with belt plies using aramid fiber cords in place of steel cords of the same structure is at most 75 percent of the power obtained with a tire having steel-cord belt plies. With aramid fiber cords, therefore, it has been believed practically impossible to enhance the steering stability to the level attainable with a tire of the belt structure using steel cords.

SUMMARY OF THE INVENTION

This invention has for its object the provision of a pneumatic radial tire for passenger cars which is reduced in weight by the use of aramid fiber cords in the belt structure and yet is capable of achieving steering stability well comparable to that of the conventional tire having belt plies of steel cords.

The pneumatic radial tire for passenger cars which realizes the above object has a plurality of grooves formed in the tread and extending at least circumferentially of the tire, the tread being provided with two belt plies therein, characterized in that the grooves have a depth in the range of 6.0 to 8.5 mm, with the thickness of the under-groove rubber layer from the bottom of the grooves to the outer belt ply being fixed within the range of 0.5 to 2.5 mm, said belt plies being both made from aramid fiber cords or either of said plies being made from aramid fiber cords while the other ply is made from steel cords, with the both edge portions of at least one of said belt plies being folded back toward the center of the tread at a fold percentage of 8 to 100 percent.

As defined above, at least one of the two belt plies is made from aramid fiber cords and, in addition, the depth of grooves and the thickness of the rubber layer under the grooves are fixed to be less than those in conventional tires. Consequently, the tire is lighter than the conventional tires using belt plies of steel cords. Moreover, because the both edge portions of at least one of the two belt plies are folded back to enhance the flexural rigidity, the tire can exhibit a cornering power as high as or even greater than that of a conventional tire having steel-cord belt plies.

For the purposes of the invention the term "depth of grooves" (d) is used to mean the distance, as shown in FIG. 2, measured perpendicularly from the tread surface to the bottom of the deepest of the grooves. The expression "thickness of the rubber layer under the grooves" (t) applies to the distance between the bottom of the deepest groove and the surface of the cords of the outer belt ply (4u). By the "fold percentage" (%) of a belt ply is meant the sum of the widths (w, w') of folds of the both edge portions divided by the total width (W) of the belt ply so folded back, expressed in percent.

DETAILED DESCRIPTION OF THE PREFERRED EMBODIMENTS

Figure 1:
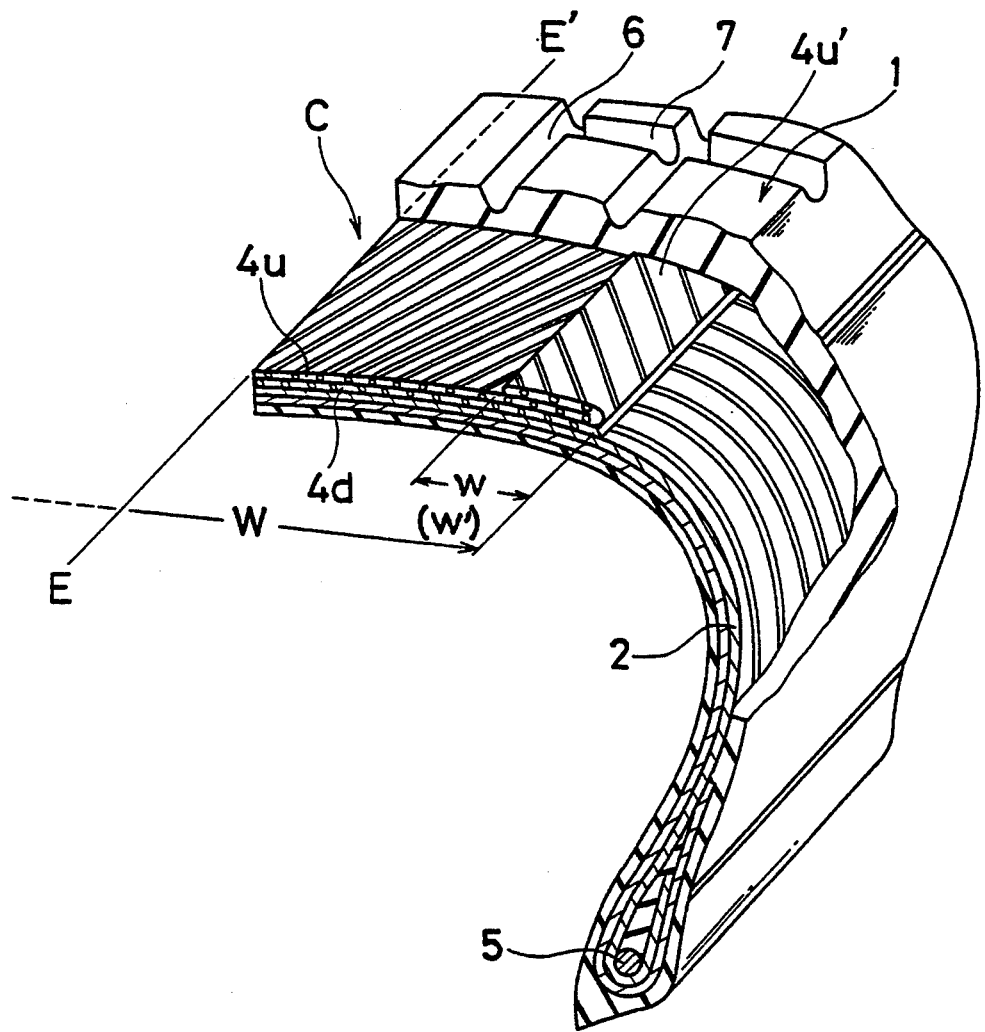
FIG. 1 is a perspective view of the essential parts, partly broken, of a radial tire for passenger cars embodying the present invention.
Figure 2:
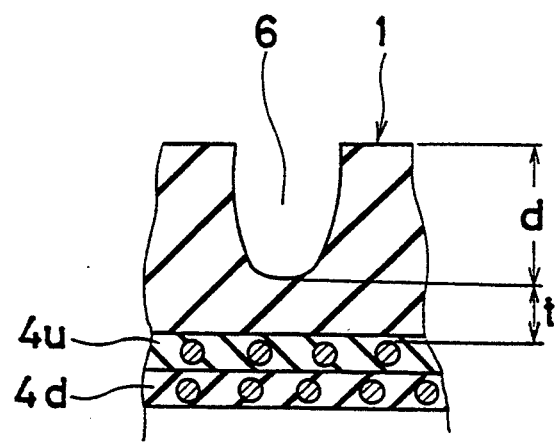
FIG. 2 is an enlarged sectional view of a main groove portion in the tread of the tire according to the invention.

FIGS. 1 and 2 illsutrate a pneumatic radial tire for passenger cars constructed in accordance with the present invention. In the drawing, 1 is the tread and 2 is the carcass comprising organic fabric cords, such as nylon or polyester cords. The carcass 2 extends transversely and is folded round each of a pair of bead cores 5, inside out. In the carcass the angle of cords to the circumferential direction EE' of the tire is substantially 90 deg. In the tread 1 there are disposed outside the carcass 2 two plies of aramid fiber cords, inner belt ply 4d and outer belt ply 4u, along the circumference of the tire. Of these two belt plies 4d, 4u, the outer ply 4u is folded back along the both edges toward the center of the tread C, forming a fold 4u' of a width W along each edge. The fold percentage ranges from 8 to 100 percent. The inner belt ply 4d and the outer belt ply 4u form cord angles of 5 to 40 deg to the circumferential direction EE' of the tire and extend in a crisscross pattern.

The surface of the tread 1 has main grooves 6 formed in the circumferential direction EE' of the tire and auxiliary grooves 7 extending across the main grooves. The depth d of the main grooves 6 is fixed within the range from 6.0 to 8.5 mm and the thickness t of rubber under the grooves within the range from 0.5 to 2.5 mm.

In realizing this invention, the present inventors made extensive search for the factors that would determine the cornering power of radial tires, on condition that they would favor the weight reduction of the tires. They have found, as a result, that the depth of the grooves formed in the tread principally along the circumference of the tire and the thickness of the rubber layer under the grooves are major determinants of cornering power and that the cornering power increases as the depth of grooves and the thickness of the rubber layer under the grooves decrease, as will be explained in detail later in connection with experimental results. It was found that this relation holds regardless of whether the grooves running circumferentially of the tire are straight or zigzag and whether there are auxiliary grooves formed across them in the width direction of the tire. However, as noted above, replacement of the cords of both belt plies from steel to aramid fiber results in a loss of up to about 25% of cornering power. The inventors also found that practically this cornering power loss cannot be made up for solely by the technical improvements in respect of the groove depth and the thickness of the rubber layer under the grooves. It has now been found that the object of the invention can be achieved by the combination of the above improvements with folding back of the both edge portions of at least one belt ply toward the center of the tread.

The invention will now be described in detail with reference to its experimental examples.

Figure 6:
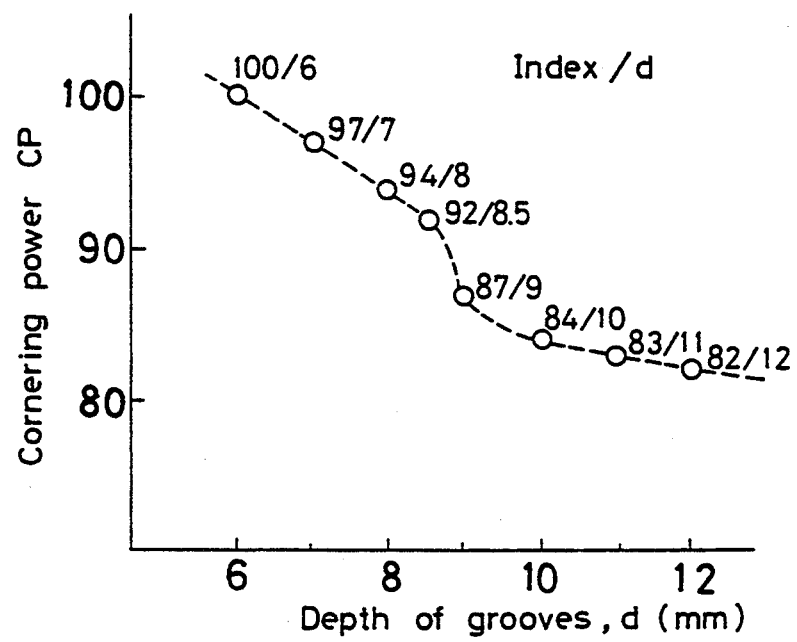
FIG. 6 is a graph showing the relation between the depth d of grooves and the cornering power CP.

FIG. 6 shows experimental results on the relation between the depth d of grooves and the cornering power CP. The experiments were conducted with eight different radial tires which had a common tire structrue but varied in the groove depth d; 6, 7, 8, 8.5, 9, 10, 11, and 12 mm.

Tread structure: in the structure of FIG. 1 the belt plies had no fold.
Tire size: 185/70R13
Belt structure:
  Number of belt plies: two
  Width of belt plies: outer/inner=120/130 mm
  Cords: aramid fiber 1500 D/2
  End count: 45 ends/50 mm
Thickness of the rubber layer under grooves:
  3.0 mm The cornering power CP was determined by a drum test, in which the test tire was driven to run under a load of 450 kgf and at a speed of 10 km/h. The lateral force at the time of the slip angle of 1 deg rightward and that at the slip angle of 1 deg leftward were measured, and the mean of the both measured values (absolute mean) was given as an index, with the measured value of a tire with a groove depth of 6 mm being 100.

Figure 7:
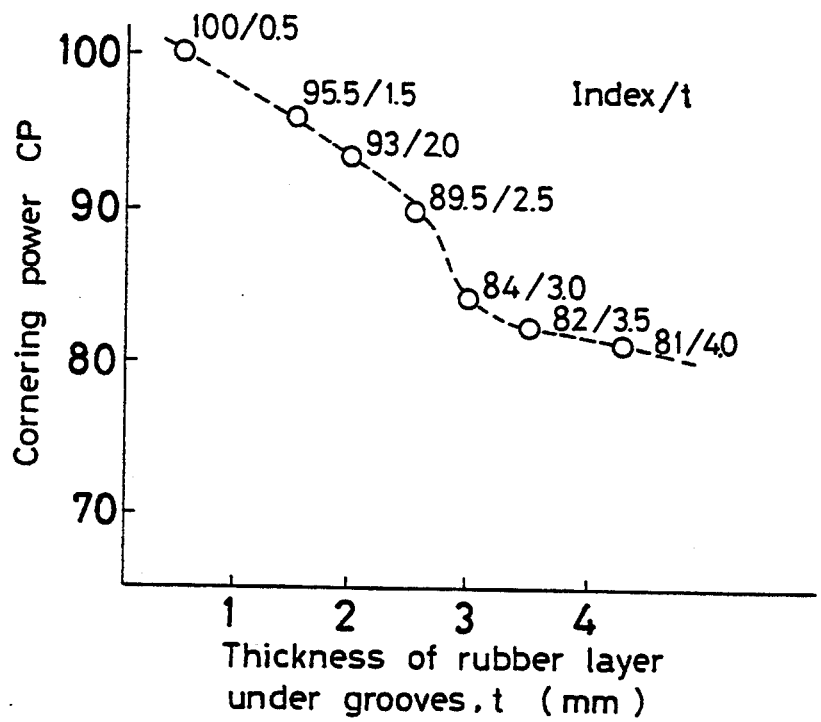
FIG. 7 is a graph showing the relation between the thickness t of rubber under grooves and the cornering power CP.

FIG. 7 shows the experimental results on the relation between the thickness t of rubber under grooves and the cornering power CP. The experiments were performed with seven different radial tires which had the same tread structure, tire size, belt structure, and groove depth of 8.5 mm as those of the tires used in the experiments described above. The tires differed only in the thickness of the rubber layer under grooves t, varying from 0.5 to 1.5, 2.0, 2.5, 3.0, 3.5, and 4.0 mm. The cornering power CP was determined in the same way, as an index with the measured value of a tire having an under-groove rubber thickness t of 0.5 mm being 100.

As regards the depth of grooves, FIG. 6 indicates that the shallower the grooves the greater the cornering power CP and that the power increases sharply as the groove depth decreases below 8.5 mm. This tendency is not limited to the tires of the size tested but is also observed with tires of the other sizes. In conventional radial tires the depth of tread grooves usually ranges from 8 to 11 mm. In the present invention, on the basis of the results shown in FIG. 6, the groove depth is set within the range of 6.0 to 8.5 mm, preferably 6.0 to 7.5 mm. The lower limit of 6.0 mm is chosen in consideration of the wear-resistance life. If the grooves are shallower than this, the tire is no longer suited for practical use.

As for the thickness of the rubber layer under grooves t, it is obvious from FIG. 7 that the cornering power CP increases as the thickness decreases, the power increasing drastically with the thickness below 2.5 mm. Generally the same is true of tires of other sizes. With conventional radial tires a thickness of the rubber layer under grooves in the range of 2.5 to 4 mm is common. According to the present invention, by contrast, a range of 0.5 to 2.5 mm, preferably 1.0 to 2.0 mm, is chosen in view of the data given in FIG. 7. The lower limit of 0.5 mm is set as the minimum for protecting the belt cords and preventing them from breaking or other trouble.

As stated above, the cornering power CP can be increased by reducing the depth d of the (main) grooves formed in the tread and by decreasing the thickness t of rubber under the grooves. However, the favorable effect of the groove depth d upon the cornering power CP is such that, in the case where the depth is at the lower limit of 6.0 mm, at most about 9% more power is produced than by a conventional tire having the lower-limit groove depth of 8.5 mm. Also, the improvement in cornering power CP with the thickness t of rubber under grooves, in the case of the lower-limit thickness 0.5 mm, is at most about 19% over the power acquired with a conventional tire having a lower-limit thickness of 3.0 mm. Thus, the low flexural rigidity of the belt plies of aramid fiber cords cannot be offset satisfactorily by the adjustments of the depth d of grooves and the thickness t of rubber under the grooves. It is difficult for the tire with such belt plies to exhibit cornering power greater than that with steel-cord belt plies.

The present invention makes up for the lack of cornering power due to the mere combination of the groove depth d and the under-groove rubber thickness t by additional flexural rigidity, which results from folding back the both edge portions of at least one of two belt plies toward the center of the tread. In this way a cornering power equivalent to or more than that with steel-cord belt plies can be obtained.

Figure 8:
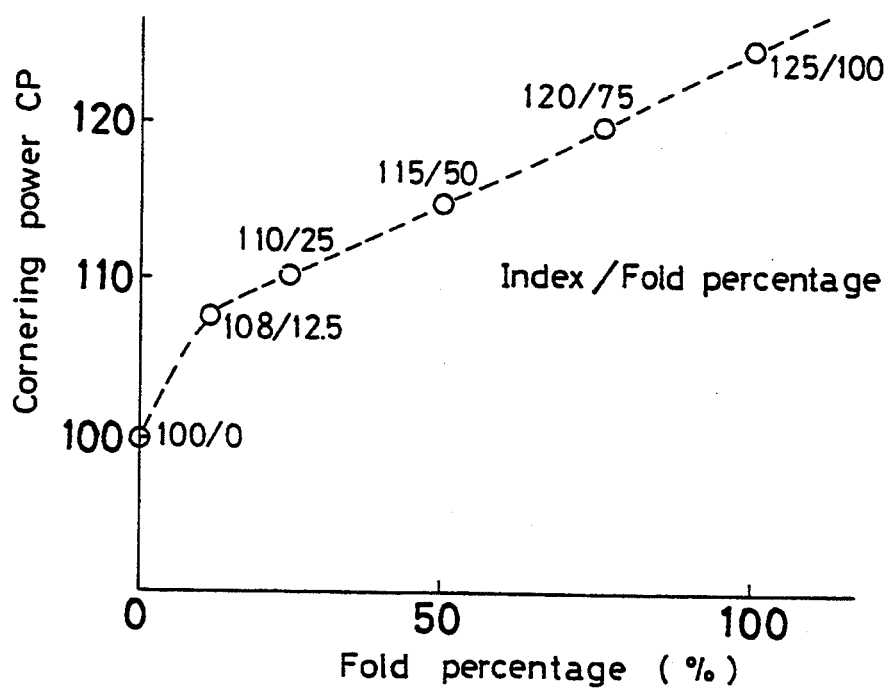
FIG. 8 is a graph showing the relation between the fold percentage (%) and the cornering power CP.

FIG. 8 shows experimental results on the relation between the percentage of folding of the both edge portions of belt plies using aramid fiber cords and the cornering power CP. The experiments were conducted with six different radial tires which had the same tread structure, tire size, and belt structure as those of the tires used for the experiments summarized in FIG. 6 excepting that the both edge portions of the outer belt ply were folded back as illustrated in FIG. 1. The test tires had a groove depth of 7.0 mm and under-groove rubber thickness of 2.0 mm in common, but varied in the percentage of fold of the outer belt ply, from 0% to 12.5, 25, 50, 75, and 100%. The cornering power CP was determined by the same method as used for FIG. 6, and expressed as an index on the basis of a fold percentage of 0% (where there is no fold) being 100.

As is clear from FIG. 8, cornering power CP was found to increase on folding the both edge portions of the aramid-fiber cord belt ply even at a slight fold percentage. It can be seen that the power increases linearly as the fold percentage rises. However, increasing the fold percentage of the both edge portions of the belt ply in excess of 100% is undesirable because the edge portions overlap to mar the durability or lightness of the tire. The fold percentage is desirably in the range of 8 to 100%, more desirably 30 to 80%.

In the present invention, it is desired that both of two belt plies be fabricated from aramid fiber cords. Alternatively, one ply may comprise aramid fiber cords and the other comprises steel cords. The two belt plies are placed one over another each at a cord angle of 5 to 40 deg, preferably 15 to 30 deg, to the circumferential direction of the tire, in such a manner that the belt cords of two plies cross each other, with the width in the meridian direction of the tire being 80 to 130%, preferably 90 to 110% of the read-contacting width of the tire.

Figure 3:
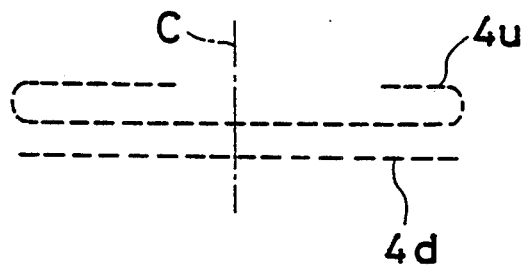
FIGS. 3 to 5 are diagrammatic sectional views of other modifications of the belt plies of the tire according to the invention.
Figure 4:
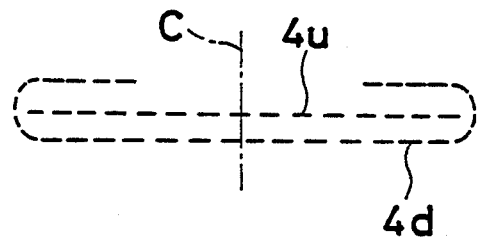
Figure 5:
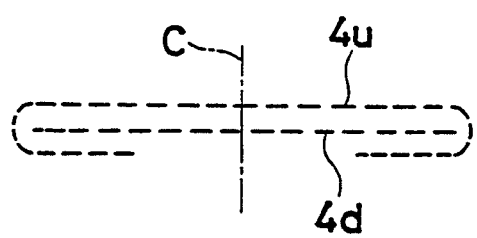

Although only one of the two belt plies has to be folded back along the both edge portions, the both plies may be folded back, when necessary. Also, while the folds of the both edge portions desirably are symmetric, they may be asymmetric as shown in FIG. 3. Folding back the outer belt ply as shown favors productivity, but it is possible instead to fold back the both edge portions of the inner belt ply $4d$ so as to wrap the edge portions of the outer belt ply $4u$ as depicted in FIG. 4 or fold back the both edge portions of the outer belt ply $4u$ inwardly to wrap the both edge portions of the inner belt ply $4d$.

In the practice of the invention, desirable aramid fiber cords to be used in the belt plies comprise twisted yarns of filaments with the total denier of 500 to 5000 D, preferably 2000 to 3000 D. For good adhesion to rubber coating the twisted yarns are surface treated with an adhesive, such as epoxy resin or resorcin-formalin-latex (RFL). The treated cords are loosely woven like a ratten blind. The loose fabric is coated with a rubber coating material to form a coat with a thickness 0.1 to 1.0 mm larger than the diameter of the cords. Desirably, the coating attains a thickness equivalent to the diameter of the cords plus 0.1 to 0.6 mm.

EXAMPLE 1

Tire 1, a tire embodying the present invention, which had a tire structure shown in FIG. 1 and a tire specification given in Table 1 with the following tread pattern, was built.

Tread pattern:

Four 6 mm-wide straight main grooves were formed, thus defining five ribs almost equivalent in width, on the road-contacting surface of the tread circumferentially of the tire. A plurality of auxiliary grooves having a width of 4 mm and the same groove depth as that of the straight main grooves were formed radially at the intervals of about 26 mm to divide the ribs into blocks. Thus, a block pattern was made in which five rows of 72 rectangular blocks each were arranged along the circumference of the tire.

Eight more tires, Tires 2 and 3 embodying the invention and Comparative Tires 1 to 5, were manufactured, all conforming to the specification of Tire 1 of the invention except that the percentage of fold along the both edge portions of a belt ply, the depth d of grooves, and the thickness t of rubber under the grooves were changed to the values given in Table 3. Also, for comparison purposes, a conventional tire was made to the same specification as Tire 1 of the invention except for the use of steel cords of a construction $1 \times 5$ (0.25 mm) in place of the aramid fiber cords.

The nine tires were evaluated in respect of the cornering power CP as determined by the method already described in connection with FIG. 6. The results are given, together with the comparison of weights per tire, in Table 3. The numerical values of cornering power CP thus evaluated are indices based on the CP value of the conventional tire as 100. The weights of the tires are based on the weight of the conventional tire as the reference.

TABLE 1

| | |
|---|---|
| Tire size | 185/70R13 |
| Type of cord Belt ply | 1500D/2 aramid fiber |
| Angle of cords circumferentially of tire | 21 deg |
| End count | 45/50 mm width |
| Width of the outer belt ply | 120 mm |
| Width of the inner belt ply | 130 mm |
| Tread rubber | Rubber composition of Table 2 |
| Depth of grooves, d | 8.5 mm |
| Thickness of rubber under grooves, t | 2.5 mm |

TABLE 2

| Compounding ingredient | Proportion (part by weight) |
|---|---|
| SBR[1] | 137.5 |
| Zinc oxide | 1.5 |
| Stearic acid | 2.0 |
| Antioxidant[2] | 1.8 |
| Wax[3] | 1.0 |
| Carbon black HAF | 70.0 |
| Aromatic oil | 3.0 |
| Vulcanization accelerator[4] | 2.5 |
| Sulfur powder | 2.1 |

[1]"Nipol 1712" a styrene-butadiene copolymer rubber mfd. by Nippon Zeon Co., Ltd.
[2]"Nocrack 6C" by Ouchishinko Kagaku K.K.
[3]"Sunnock" by Ouchishinko Kagaku K.K.
[4]"Sanceler 232-MG" by Sanshin Kagaku K.K.

TABLE 3

| | d (mm) | t (mm) | Material of belt ply Outer ply | Material of belt ply Inner ply | Fold percentage (%) | CP index | Weight per tire g |
|---|---|---|---|---|---|---|---|
| Conventional tire | 8.5 | 3.0 | steel | steel | 0 | 100 | Reference |
| Comparative Tire 1 | 8.5 | 3.0 | aramid | aramid | 0 | 75 | −530 |
| Comparative Tire 2 | 8.5 | 3.0 | aramid | aramid | 100 | 95 | −165 |
| Comparative Tire 3 | 8.5 | 2.5 | aramid | aramid | 0 | 80 | −710 |
| Tire 1 of Invention | 8.5 | 2.5 | aramid | aramid | 100 | 101 | −345 |
| Comparative Tire 4 | 6.0 | 2.5 | aramid | aramid | 0 | 88 | −1380 |
| Tire 2 of Invention | 6.0 | 2.5 | aramid | aramid | 50 | 100 | −1200 |
| Comparative Tire 5 | 6.0 | 0.5 | aramid | aramid | 0 | 98 | −2100 |

TABLE 3-continued

|  | d (mm) | t (mm) | Material of belt ply | | Fold percentage (%) | CP index | Weight per tire g |
| --- | --- | --- | --- | --- | --- | --- | --- |
|  |  |  | Outer ply | Inner ply |  |  |  |
| Tire 3 of Invention | 6.0 | 0.5 | aramid | aramid | 8 | 104 | −2070 |

Table 3 shows that when, as in Comparative Tire 1, the steel cords of the conventional tire are replaced by aramid fiber cords, the weight of the tire is reduced by 530 g with the penalty of a 25% drop of the cornering power CP.

The fold percentage of the both edge portions of the belt ply in Comparative Tire 1 was increased to 100% in Comparative Tire 2. The thickness t of rubber under the grooves in the first comparative tire was reduced to 2.5 mm in Comparative Tire 3. The both modifications made weight reduction possible but did not provide the tires with a cornering power CP comparable to that of the conventional tire.

In contrast with these, Tire 1 of the invention which had an under-groove rubber thickness t of 2.5 mm and a fold percentage of 100% at the both edge portions of the belt ply enabled the tire to reduce its weight and show a cornering power CP equivalent to that of the conventional tire.

Comparative Tire 4, like Comparative Tire 3, used belt plies not folded back, but the depth d of the grooves was decreased to 6.0 mm. In this case the cornering power CP increased only slightly and failed to reach the level of the conventional tire, although the tire weight was decreased. It can be seen that Tire 2 of the present invention, which was an improvement over the fourth comparative tire, with a fold percentage set to 50% at the both edge portions of the belt ply, achieved both weight reduction and a cornering power CP comparable to that of the conventional tire.

The depth d of the grooves and the thickness t of rubber under the grooves were fixed to the lower limits of 6.0 mm and 0.5 mm, respectively, but the both edge portions of the belt ply were not folded back in Comparative Tire 5. The cornering power CP was up to only 98% of the level of the conventional tire, although the tire weight could be reduced.

In tire 3 of the invention, the both edge portions of the belt ply were turned up with a fold percentage of 8%. The tire was 2070 g lighter than the conventional tire and its cornering power CP was improved to 104% of that of the ordinary tire.

EXAMPLE 2

Tires 4 and 5 of the invention were built in conformity with the specification of Tire 2 in Example 1, with the exception that in Tire 4 the inner belt ply was replaced by a steel-cord belt ply (without folding) and in Tire 5 the outer belt ply was replaced by a steel-cord one (with folds).

These tires, 4 and 5, according to the invention were evaluated for their cornering power CP and weight in the manner described in the preceding example. The cornering power CP of Tire 4 of the invention was 119, and the tire weight was 930 g less than that of the original tire. Tire 5 showed a cornering power CP value of 127 and a weight reduction of 810 g. It was thus confirmed that the use of steel cords in either of two belt plies ensures a great cornering power CP while maintaining the lightness.

According to this invention, the both belt plies are fabricated from aramid fiber cords or alternatively, either belt ply is made from aramid fiber cords and the other from steel cords, and the depth of grooves formed in the tread and the thickness of the rubber layer under the grooves are fixed to be less than those in conventional tires. Consequently, the tire of the invention is lighter than the existing tires having belt plies that use steel cords. In addition to the smaller values of the groove depth and under-groove rubber thickness, the tire attains an increased flexural rigidity by the folding of the both edge portions of one of the two belt plies at a certain fold percentage. The synergistic effect of these features improves the steering stability of the tire while, at the same time, exhibiting a cornering power greater than that of the radial tires having belt plies that incorporate steel cords.

What is claimed is:

1. A pneumatic radial tire for passenger cars having a plurality of grooves formed in the tread and extending at least circumferentially of the tire, the tread being provided with two belt plies therein, said grooves having a depth in the range of 6.0 to 8.5 mm, with the thickness of the under-groove rubber layer from the bottom of the grooves to the cord surface of the outer belt ply being fixed within the range of 0.5 to 2.0 mm, said belt plies being both made from aramid fiber cords, with the both edge portions of at least one of said belt plies being folded back toward the center of the tread at a fold percentage of 8 to 100 percent, said belt plies forming cord angles of 5° to 40° to the circumferential direction of the tire.

2. A radial tire according to claim 1, in which the folds of the both edge portions of said at least one belt ply are symmetric.

3. A radial tire according to claim 1, in which the both edge portions of the outer belt ply are folded back toward the center of the tread.

4. A radial tire according to claim 2, in which the both edge portions of the outer belt ply are folded back toward the center of the tread.

5. A radial tire according to claim 1, in which the folding structure of the belt plies is such that the both edge portions of either ply wrap the both edge portions of the other ply.

6. A radial tire according to claim 1, in which the aramid fiber cords comprise twisted yarns of filaments with a total cord denier of 500 to 5000 D.

7. A pneumatic radial tire for passenger cars having a plurality of grooves formed in the tread and extending at least circumferentially of the tire, the tread being provided with two belt plies therein, said grooves having a depth in the range of 6.0 to 8.5 mm, with the thickness of the under-groove rubber layer from the bottom of the grooves to the cord surface of the outer belt ply being fixed within the range of 0.5 to 2.0 mm, one of said belt plies being made from aramid fiber cords and the other ply from steel cords, said belt plies forming cord angles of 5°–40° to the circumferential direction of the tire, with the both edge portions of at least one of said belt plies being folded back toward the center of the tread at a fold percentage of 8 to 100 percent.

8. A radial tire according to claim 7, in which the folds of the both edge portions of said at least one belt ply are symmetric.

9. A radial tire according to claim 7, in which the both edge portions of the outer belt ply are folded back toward the center of the tread.

10. A radial tire according to claim 8, in which the both edge portions of the outer belt ply are folded back toward the center of the tread.

11. A radial tire according to claim 7, in which the folding structure of the belt plies is such that the both edge portions of either ply wrap the both edge portions of the other ply.

12. A radial tire according to claim 7, in which the aramid fiber cords comprise twisted yarns of filaments with a total cord denier of 500 to 5000 D.

* * * * *